(12) United States Patent
Hanna et al.

(10) Patent No.: US 7,085,925 B2
(45) Date of Patent: Aug. 1, 2006

(54) TRUST RATINGS IN GROUP CREDENTIALS

(75) Inventors: Stephen R. Hanna, Bedford, MA (US);
Anne H. Anderson, Acton, MA (US);
Yassir K. Elley, Waltham, MA (US);
Radia J. Perlman, Acton, MA (US);
Sean J. Mullan, Dublin (IE)

(73) Assignee: Sun Microsystems, Inc., Santa Clara, CA (US)

( * ) Notice: Subject to any disclaimer, the term of this patent is extended or adjusted under 35 U.S.C. 154(b) by 821 days.

(21) Appl. No.: 09/825,100

(22) Filed: Apr. 3, 2001

(65) Prior Publication Data

US 2002/0144149 A1 Oct. 3, 2002

(51) Int. Cl.
*H04L 9/00* (2006.01)
*H04L 9/32* (2006.01)

(52) U.S. Cl. .................... 713/157; 726/10; 713/155; 713/175

(58) Field of Classification Search ............... 713/155, 713/175, 176, 185, 200, 156, 157; 726/10
See application file for complete search history.

(56) References Cited

U.S. PATENT DOCUMENTS

| | | | | |
|---|---|---|---|---|
| 5,005,200 A | * | 4/1991 | Fischer | 380/30 |
| 5,214,702 A | * | 5/1993 | Fischer | 380/30 |
| 5,220,604 A | * | 6/1993 | Gasser et al. | 707/9 |
| 5,339,403 A | * | 8/1994 | Parker | 711/221 |
| 5,872,848 A | * | 2/1999 | Romney et al. | 713/176 |
| 5,878,144 A | * | 3/1999 | Aucsmith et al. | 380/30 |
| 5,958,050 A | * | 9/1999 | Griffin et al. | 713/200 |
| 6,105,027 A | * | 8/2000 | Schneider et al. | 707/9 |
| 6,134,550 A | * | 10/2000 | Van Oorschot et al. | 707/9 |
| 6,243,667 B1 | * | 6/2001 | Kerr et al. | 703/27 |
| 6,308,277 B1 | | 10/2001 | Vaeth et al. | 713/201 |
| 6,324,648 B1 | * | 11/2001 | Grantges, Jr. | 726/12 |

(Continued)

OTHER PUBLICATIONS

Treasury Board of Canada, *Digital Signature and Confidentiality Certificate Policies for the Government of Canada Public Key Infrastructure*, version 3.02, Apr. 1999.

(Continued)

*Primary Examiner*—Christopher Revak
*Assistant Examiner*—Kaveh Abrishamkar
(74) *Attorney, Agent, or Firm*—Kudirka & Jobse, LLP

(57) ABSTRACT

A method and system for evaluating a set of credentials that includes at least one group credential and that may include one or more additional credentials. A trust rating is provided in association with the at least one group credential within the set of credentials and trust ratings may also be provided in other credentials within the set of credentials. Each trust rating provides an indication of the level of confidence in the information being certified in the respective credential. In response to a request for access to a resource or service, an evaluation of the group credentials is performed by an access control program to determine whether access to the requested resource or service should be provided. In one embodiment, within any given certification path a composite trust rating for the respective path is determined. An overall trust rating for the set of credentials is determined based upon the composite trust ratings. Upon a determination that a user requesting access to a resource has an acceptable set of credentials and a satisfactory trust rating, access to the requested resource or service is granted to the user.

13 Claims, 5 Drawing Sheets

U.S. PATENT DOCUMENTS

| | | | |
|---|---|---|---|
| 6,405,313 B1* | 6/2002 | Reiter et al. | 713/156 |
| 6,408,336 B1* | 6/2002 | Schneider et al. | 709/229 |
| 6,609,198 B1* | 8/2003 | Wood et al. | 713/155 |
| 6,668,322 B1* | 12/2003 | Wood et al. | 713/182 |
| 6,853,988 B1* | 2/2005 | Dickinson et al. | 705/75 |
| 6,938,155 B1* | 8/2005 | D'Sa et al. | 713/160 |
| 2004/0049687 A1* | 3/2004 | Orsini et al. | 713/189 |

OTHER PUBLICATIONS

ITU-T, *Telecommunication Standarization Sector of ITU, Information Technology ñ Open Systems Interconnection ñ the Directory: Authentication Framework*, X.509, (Jun. 1997), ITU, 1995.

Draft Revised ITU-T Recommendation X.509/ISO/IEC 9594-8; *Information Technology—Open Systems Interconnection—The Direction: Public-Key And Attribute Certificate Frameworks* .

TLS Working Group, Internet-Draft, *TLS Extensions for Attribute Certificate Based Authorization*, Stephen Farrell, Feb. 28, 1996.

Transport Layer Security Working Group, Internet-Draft, *An Internet Attribute Certificate Profile for Authorization*, Stephen Farrell, Aug. 20, 1998.

PKIX Working Group, Internet-Draft, *An Internet Attribute Certificate Profile for Authorization*, Stephen Farrell, Baltimore Technologies, R. Housley, Spyrus, Aug. 8, 2000.

* cited by examiner

TRUST RATINGS IN GROUP CREDENTIALS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to techniques for verifying membership within a group authorized to obtain access to a predetermined resource within a computer network, and more particularly, to the assignment and use of a trust rating in at least one group credential within a set of credentials in determining whether to provide access to the specified resource.

Group credentials, such as group membership certificates, group non-membership certificates and group membership lists are used in computer networks to indicate whether a user or another group is authorized to obtain access to predetermined resources. When a certification authority issues a group credential, the issuer is making a certified statement with respect to the membership status of one or more users or groups. In some cases, the issuer may be using information from another source to determine whether or not to issue a group credential. The information obtained from the other source, however, may have varying levels of trustworthiness.

Certificate policies as described in the ITU-T Recommendation X.509 have been used in the past in the context of identity certificates. As described in the X.509 Recommendation, when a certification authority (CA) issues an identity certificate for a subject, the CA is able to mark the identity certificate with a policy that describes the circumstances under which the certificate was issued. Such policies have included information indicative of the reliability of the binding between the principal name and an associated public key.

It would be desirable, when evaluating a set of credentials including at least one group credential to have a mechanism for evaluating the set of credentials to ascertain a level of confidence that should be ascribed to the set of credentials in deciding whether or not to grant a user access to a predetermined resource.

BRIEF SUMMARY OF THE INVENTION

Consistent with the present invention, a method and system is disclosed for evaluating a set of credentials that includes at least one group credential and may include one or more additional credentials. A trust rating is provided in association with the at least one group credential and trust ratings may also be provided in other credentials within the set of credentials. Each trust rating provides an indication of the level of confidence associated with the information being certified in the respective credential. In response to a request for access to a resource, an evaluation of the group credential is performed by at least one access control program to determine whether access to the requested resource should be provided. Within any given certification path formed by the set of credentials, such as identity certificates, group membership certificates, group non-membership certificates and group membership lists, a composite trust rating for the respective path is determined. In one embodiment, the composite trust rating comprises the lowest trust rating of any credential in the relevant path. In the event plural certification paths exist within the set of credentials, the composite trust level for each certification path is established as described above and an overall trust rating is determined to be the highest composite trust rating among the various certification paths. Upon a determination that a user requesting access to a resource has an acceptable set of credentials and a satisfactory overall trust rating, access to the requested resource may be granted to the user.

Other variations, aspects, features and advantages of the invention will be apparent to those of ordinary skill in the art from the Detailed Description of the Invention that follows.

BRIEF DESCRIPTION OF THE SEVERAL VIEWS OF THE DRAWING

The invention will be more fully understood by reference to the following Detailed Description of the Invention in conjunction with the drawings of which.

DETAILED DESCRIPTION OF THE INVENTION

Figure 1:
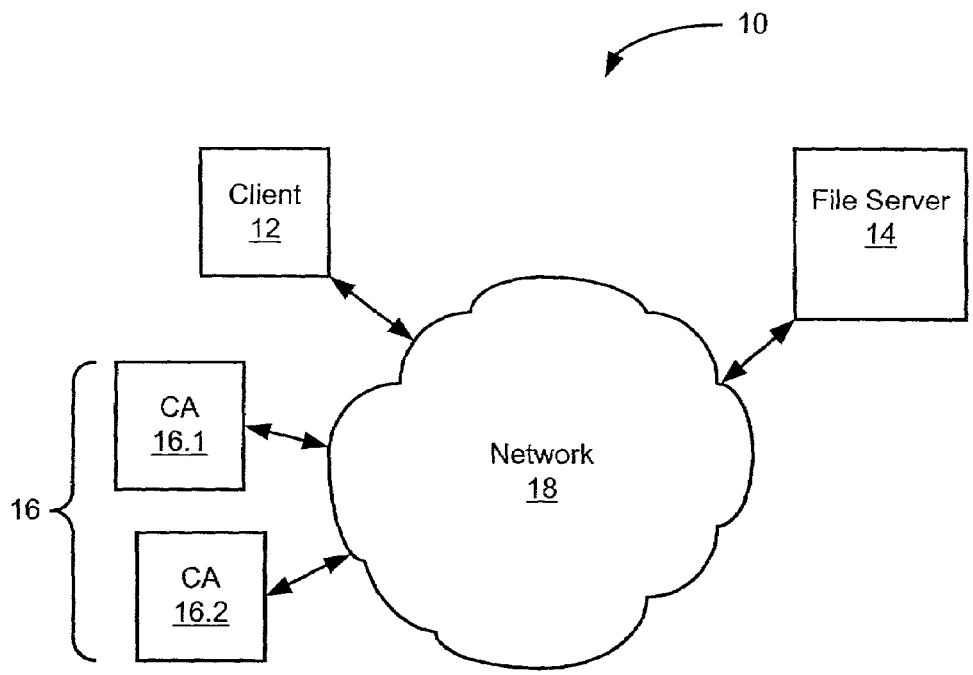
FIG. 1 is a block diagram of an exemplary system that employs a trust rating within at least one group credential in a manner consistent with the present invention.

A system 10 that employs trust ratings in at least one group credential within a set of credentials in a manner consistent with the present invention is depicted in FIG. 1. The system 10 includes at least one client 12, a file server 14 and at least one certification authority (CA) 16. Two certification authorities 16.1 and 16.2 are illustrated in FIG. 1. The client 12, the file server 14 and the certification authorities 16.1 and 16.2 may be communicably coupled via a network 18 as illustrated in FIG. 1. Alternatively, the certification authorities 16 may be indirectly coupled to the network 18 via another device or remote from and not coupled to the network 18.

The network 18 may comprise a local area network, a wide area network, a global communication network such as the Internet or any other network for communicably coupling the client 12, the file server 14 and, optionally, the certification authorities 16. Additionally, the communication paths within the network may comprise conductive paths, optical fibers and/or wireless communication links.

Figure 2:
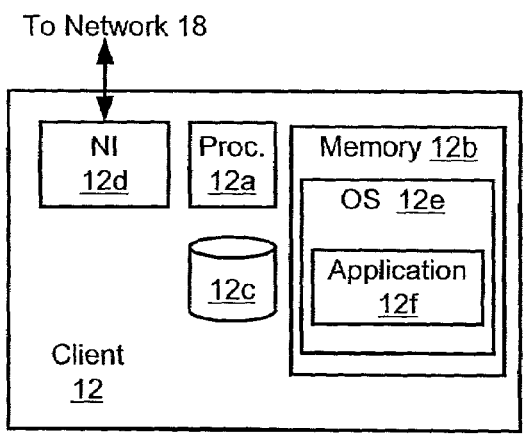
FIG. 2 is an exemplary block diagram of the client depicted in FIG. 1.

A block diagram of an exemplary client 12 is depicted in FIG. 2. The client 12 may comprise a computer or processing element, a personal digital assistant (PDA), an intelligent networked appliance, a controller or any other device capable of issuing a request for access to a resource. In the illustrated example, the resource is a file stored on a file server 14. However, it should be appreciated that the presently described techniques may be employed in any application in which a determination is being made whether to grant access to a resource or service using trust ratings as presently described.

As illustrated in FIG. 2, the exemplary client 12 includes a processor 12a that is operative to execute programmed instructions out of an instruction memory 12b. The instructions executed in performing the functions herein described may comprise instructions stored within program code considered part of the operating system 12e, instructions stored within program code considered part of an application 12f or instructions stored within program code allocated between the operating system 12e and the application 12f. The memory 12b may comprise random access memory or a combination of random access memory and read only memory. The client 12 includes a network interface 12d for coupling the client 12 to the network 18. The client 12 may also include secondary storage 12c. In the present example, the client 12 is operative to issue a request for a file as subsequently described in greater detail.

Figure 3:
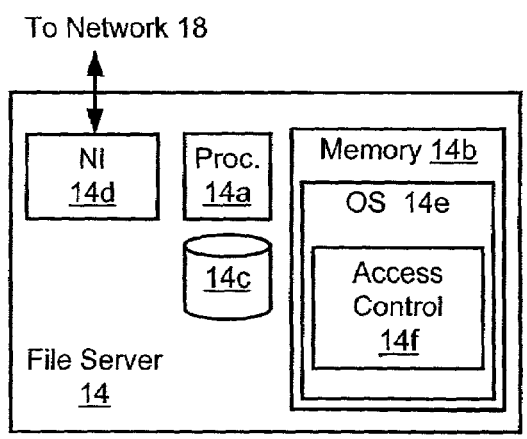
FIG. 3 is an exemplary block diagram of the file server depicted in FIG. 1.

The file server 14 is depicted generally in FIG. 3. The exemplary file server 14 includes a storage subsystem 14c that includes a hard disk array or any other data storage subsystem suitable for accessing information in response to requests issued to the file server 14 by the client 12. The file server 14 is communicably coupled to the network 18 via a network interface 14d to permit communication among the client 12, the file server 14 and certification authorities 16.

As illustrated in FIG. 3, the file server 14 includes a processor 14a that is operative to execute program instructions out of an instruction memory 14b. The instructions executed in performing the file server functions herein described may comprise instructions stored within program code considered part of an optional file server operating system 14e, instructions stored within program code considered part of a file server application such as an access control program 14f or instructions stored within program code allocated between the file server operating system 14e and the access control program 14f. The memory 14b may comprise random access memory or a combination of random access memory and read only memory. The access control program 14f within the file server 14, upon execution, is employed to evaluate a set of credentials to determine whether access to a file stored in the file server 14 should be granted as subsequently described in greater detail.

Figure 4:
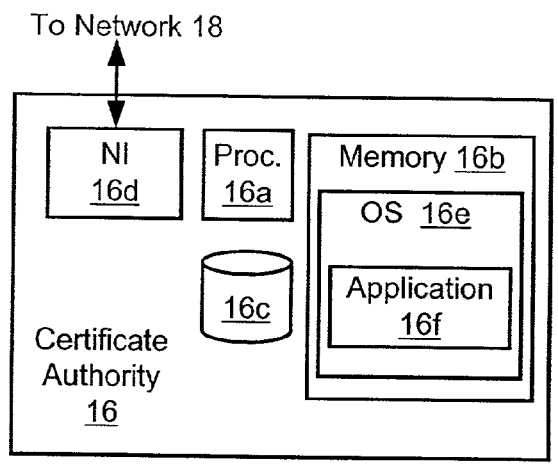
FIG. 4 is an exemplary block diagram of the certification authority depicted in FIG. 1.
Figure 5:
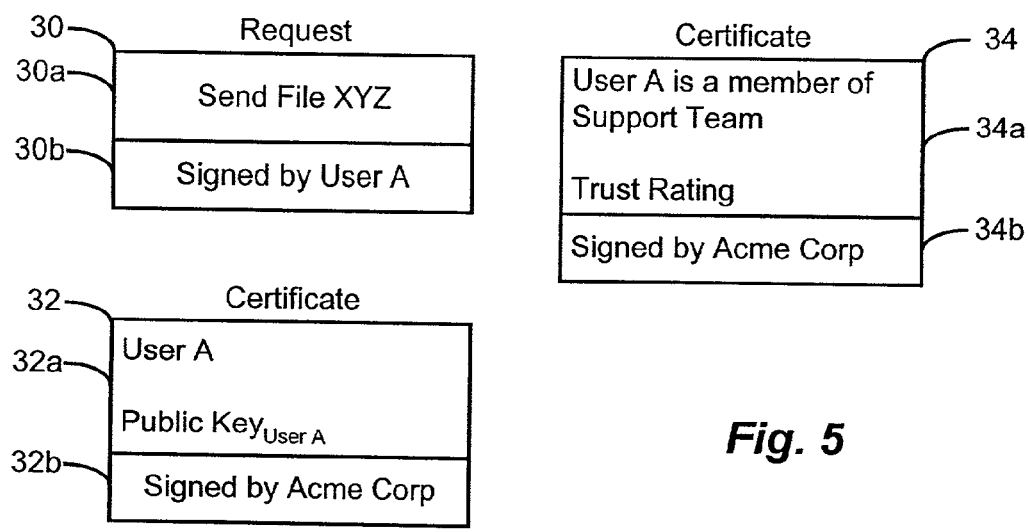
FIG. 5 depicts a set of credentials that includes a group membership certificate containing a trust rating.

A block diagram of the certification authorities 16 is depicted in FIG. 4. The certification authorities (CA) are operative to issue certificates that are signed/certified by the respective CA. Each CA 16 is, optionally, communicably coupled to the network 18 via a network interface 16d to permit communication with other CAs, the client 12 and the file server 14. Alternatively, the CAs may not be coupled to the network 18 and certificates generated by non-coupled CAs may be accessed by other devices that are coupled to the network 18.

As depicted in FIG. 4, the exemplary CA 16 includes a processor 16a that is operative to execute programmed instructions out of an instruction memory 16b. The instructions executed in performing the CA functions herein described may comprise instructions stored within program code considered part of a CA operating systems 16e, instructions stored within program code considered part of a CA application 16f or instructions stored within program code allocated between the CA operating system 16e and the CA application 16f. Certificates issued by respective CAs may include trust ratings indicative of the level of confidence that may be ascribed to the information being certified by the respective CA. The memory 16b may comprise random access memory or a combination of random access memory and read only memory. Each CA may also include the secondary storage 16c for storing data for access by the respective CA 16.

The operation of the presently described system is illustrated by way of example with reference to FIGS. 1–5. For purposes of this example, it is assumed that the Acme Corp CA is one of the CAs 16, comprises the root CA, and that certificates issued by the Acme Corp CA are trusted by the file server 14. By way of illustration, it is assumed that client 12 issues a request 30 to the file server 14 to return file XYZ to the respective client 12. The request includes a message portion 30a and an authentication portion 30b. The request is authenticated via use of a digital signature using well known public key encryption techniques, via use of a shared key or via any other suitable authentication technique. In the example illustrated in FIG. 5, the request 30 is signed by User A. It is assumed that the file XYZ stored on the file server 14 is only accessible to members of a "Support Team" of Acme Corp. It is further assumed that the file server 14 either has certificates 32 and 34 stored at the file server 14 or that such certificates are available for retrieval from certification authorities 16 that either issued the respective certificates or store such certificates. Alternatively, the certificates 32 and 34 may be retrieved from the client 12 or another device.

The access control program 14f first needs to verify the request 30. More specifically, the access control program 14f obtains and verifies the public key of User A via the identity certificate 32 that was issued by the Acme Corp CA which is assumed to be one of the CAs 16. The identity certificate 32 includes a data portion 32a and an authentication portion 32b. The data portion 32a in the illustrative example includes User A's identity and User A's public key. The certificate 32 is signed by the Acme Corp CA using the Acme Corp private key. The certificate 32 may be verified using well-known authentication techniques via use of the Acme Corp public key. After verification of the certificate 32 and association of User A with the User A public key upon authentication of the certificate 32, the access control program verifies the request 30 to assure that the request originated with User A. After verifying that the request for access to file XYZ originated from User A, the access control program 14f determines whether access to file XYZ should be granted to User A by evaluation of group membership certificate 34. Certificate 34 includes a data portion 34a that indicates that User A is a member of the "Support Team". The data portion 34a also includes a trust rating that specifies the level of confidence that may be ascribed to the information contained within the certificate 34. In this case, the trust rating indicates the level of confidence that may be ascribed to the assertion that User A is a member of the Support Team. The trust rating is established based upon trustworthiness of the source of the information contained within the certificate 34. For example, the Acme Corp CA may have carefully authenticated User A to assure membership on the Support Team in which case a high trust rating may be provided in the certificate 34. Alternatively, an administrator for the Acme Corp CA may have received a telephone call requesting that a certificate be issued that identifies User A as a member of the Support Team. Under this circumstance the administrator might cause the certificate 34 to be issued with a low trust rating.

It is assumed for the present example that the file XYZ is only intended to be accessible by those members of the Support Team that have a high trust rating. It is further assumed that the trust rating contained in the data portion 34a of the certificate 34 is a high trust rating. The access control program 14f authenticates certificate 34 using the Acme Corp CA public key. Upon verification that User A is a member of the Support Team, the access control program next evaluates the trust rating contained within the certificate 34 with respect to a trust rating specified on an access control list. Since only members of the Support Team that have high trust ratings are to be granted access to file XYZ and User A is identified as a member of the Support Team and is indicated as having a high trust rating, an indication is provided by the access control program 14f that access to the resource should be granted. In response to such indication, the file server 14 accesses the file XYZ and returns the file to User A in response to the request. In the event the trust rating within the group membership certificate 34 contained a low trust rating, access to file XYZ would be denied. In the event the group membership certificate 34 contains the identity of a plurality of users and/or groups that are members of the Support Team, a trust rating may be associated with each user and/or group based upon the level of confidence of the respective CA that the respective user and/or group is a member of the Support Team. In the example depicted in FIG. 5, a single group membership certificate 34 is depicted and a single trust rating is employed.

Figure 6:
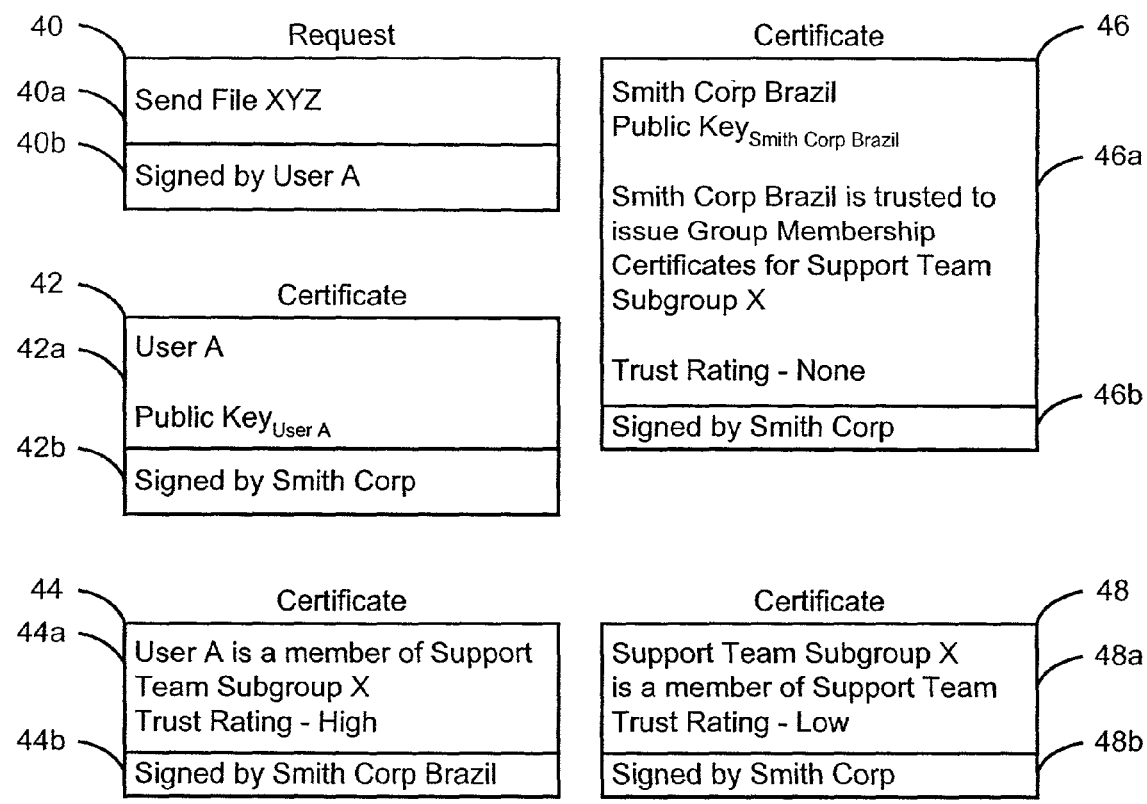
FIG. 6 depicts another set of credentials that contain group membership certificates that include trust ratings and that provide a single certification path.

The use of trust ratings in a manner consistent with the present invention is further illustrated by reference to FIG. 6 in conjunction with FIGS. 1–4. For purposes of this discussion with respect to FIG. 6, it is assumed that the Smith Corp CA is one of the CAs 16, that the Smith Corp CA comprises the root CA, and certificates issued by the Smith Corp CA are trusted by the file server 14. FIG. 6 depicts a request issued by a user and a set of credentials that include trust ratings indicating various degrees of trustworthiness for various certificates in a certification path. A certification path is a set of one or more credentials used to establish trust in an assertion, such as a mapping between a name and a public key or an association of privileges with a holder. These credentials may include identity certificates, group membership certificates, group non-membership certificates, group membership lists, certificate revocation lists and any other suitable form of credential. It is often possible to assemble multiple different certification paths from a single set of credentials, establishing various assertions.

More specifically, referring to FIG. 6 a request 40 is issued by User A associated with client 12 to the file server 14 requesting file XYZ. It is assumed that file XYZ is only available to members of a Support Team within Smith Corp. that are certified to a high level of trustworthiness through the applicable certification path. The request 40 includes a message portion 40 requesting the file XYZ and an authentication portion 40 that includes the signature of User A. The file server 14 receives the request 40. The access control program 14f determines that the request is signed by User A. To verify the request, the access control program next obtains the public key for User A by verifying certificate 42. Certificate 42 comprises an identity certificate issued by the Smith Corp. CA. Certificate 42 binds the identity of User A with the User A public key. After verifying certificate 42 using the Smith Corp public key, the access control program 14f utilizes the User A public key to verify the signature 40b within the request 40.

The access control program 14f next evaluates certificate 44. Certificate 44 comprises a group membership certificate having a data portion 44a and an authentication portion 44b. The data portion includes a certification that User A is a member of Support Team Subgroup X and additionally, that the binding between User A and Support Team Subgroup X is highly trustworthy as indicated by the high trust rating. The certificate 44 is signed by the Smith Corp Brazil CA. The access control program next attempts to verify the signature portion 44b of certificate 44. More specifically, the access control program evaluates identity certificate 46. The identity certificate 46 includes a data portion 46a binding Smith Corp Brazil to the Smith Corp Brazil public key. Additionally, the data portion 46a includes a certification that Smith Corp Brazil is trusted to issue Group Membership Certificates for Support Team Subgroup X. The certificate 46 contains no trust rating and is signed by the Smith Corp CA as depicted in the authentication portion 46b. The access control program 14f uses the Smith Corp Brazil public key to verify certificate 44.

The access control program 14f next evaluates the group membership certificate 48. Certificate 48 includes a data portion 48a that certifies that Support Team Subgroup X is a member of the Support Team (having a right of access to file XYX), however, the certification is ascribed a low trust rating. Certificate 48 is signed by the Smith Corp CA as depicted in the authentication portion 48b of certificate 48. The access control program 14f verifies the signature on the certificate 48 using the Smith Corp public Key. Thus, via the above-described certification path, the access control program 14f verifies that User A initiated the request, User A is a member of Support Team Subgroup X with a high trust rating, and that Subgroup X is a member of the Support Team with a low trust rating. The access control program 14f generates a composite trust rating which comprises the lowest trust rating within the certification path. In the present example, the composite trust rating comprises a low trust rating since the certification that Support Team Subgroup X is a member of the Support Team was only certified to a low trust rating by the Smith Corp CA in certificate 48. Accordingly, the access control program 14f provides an indication that access to the file XYZ should be denied.

Figure 7:
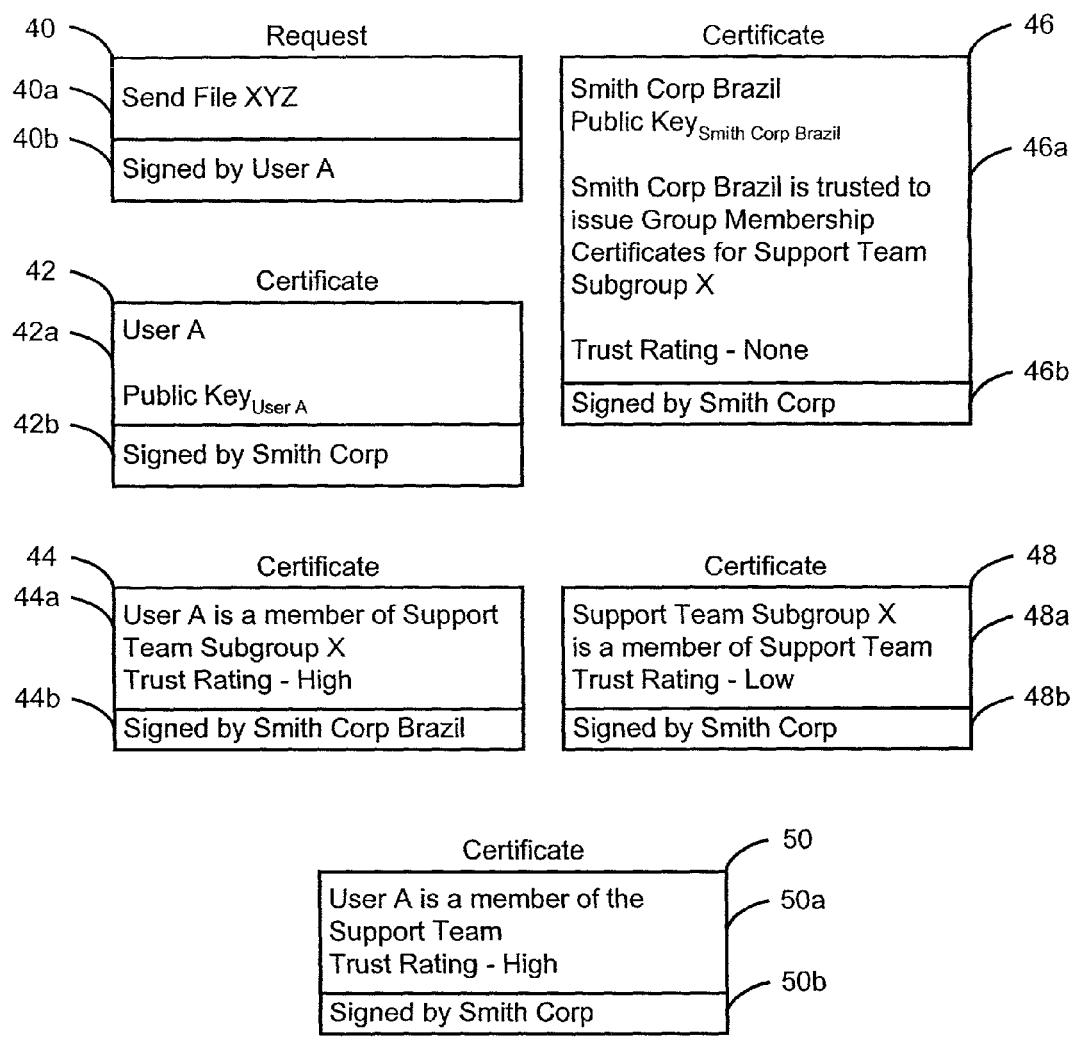
FIG. 7 depicts another set of credentials that contain group membership certificates that include trust ratings and that provide two certification paths having different overall trust ratings.

It should be appreciated that multiple certification paths may exist and that the composite trust ratings for the respective paths may differ. For example, referring to FIG. 7, all of the certificates illustrated in FIG. 6 are replicated, however an additional certificate 50 including data portion 50a and authentication portion 50b is depicted. The data portion 50a provides a certification that User A is a member of the Support Team with a high trust rating and the certificate 50 is signed by the Smith Corp CA as indicated within the authentication portion 50b. The access control program 14f verifies the signature within the authentication portion 50b using the Smith Corp public key. Thus, FIG. 7 depicts two certification paths binding User A to the Support Team. The first certification path corresponds to the path described with respect to FIG. 6 and has a low composite trust rating. The second certification path established via certificate 50 has a high composite trust rating. The access control program determines the overall trust rating to be the highest of the composite trust ratings. In the instant example, the access control program 14f generates a high overall trust rating and provides an indication that access to the file XYZ should be granted. Accordingly, the file XYZ is returned by the file server to User A associated with Client 12. While FIG. 7 illustrates two certification paths, it should be appreciated that the number of certification paths may vary based upon the particular application.

Figure 8:
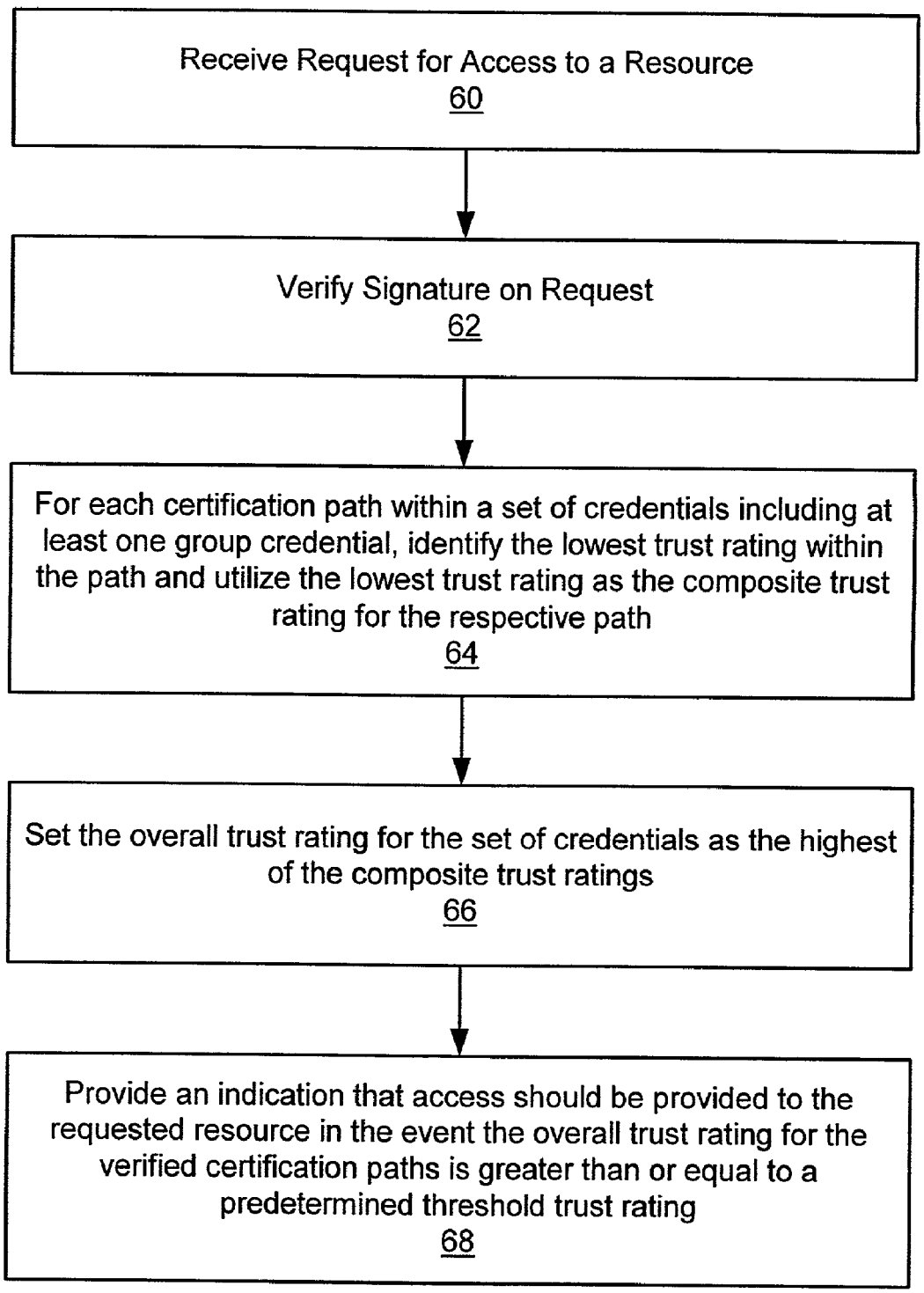
FIG. 8 depicts a method for evaluating credentials in a manner consistent with the present invention.

The presently described method for evaluating a set of credentials is further illustrated in FIG. 8. As depicted in step 60, the access control program receives a request for access to a resource. The signature on the request is verified to assure the authenticity of the request as depicted in step 62. For each certification path within a set of credentials that includes at least one group credential containing a trust rating, the lowest trust rating within the respective path is identified as the composite trust rating for that path as illustrated in step 64. An overall trust rating for the set of credentials is assigned as the highest trust rating among the composite trust ratings as depicted in step 66. The overall trust rating is compared to a predetermined threshold trust rating and a signal is provided that indicates that access to the requested resource is provided if the overall trust rating is greater than or equal to the predetermined threshold trust rating. The signal may comprise a binary signal. Alternatively, the signal may include the trust rating which may be stored for subsequent use; e.g. for storage in another group credential.

In a further illustrative example, it is assumed that the client 12 is a member of a group G2 and that G2 is a member of a group G1. It is further assumed that CA 16.1 issues certificates on behalf of Group G1 and that CA 16.2 issues on behalf of group G2. The client 12 may retrieve a group membership certificate signed by the CA 16.2 certifying that the client 12 is a member of the group G2 and present the group membership certificate to the CA 16.1 for group G1. The CA 16.1 for group G1 needs to know the public key for group G2 in order to verify the signature on the certificate issued by the CA 16.2. Assuming that the CA 16.1 for group G1 is only able to establish a low trust certificate chain to G2, the CA 16.1 only has low trust in the identity of the key it will be using to verify the certificate issued by CA 16.2 for group G2. The CA 16.1 may not be sure whether the public key that it has obtained for the CA 16.2 is in fact associated with the CA 16.2 for group G2 on its membership list. In this event, the CA 16.1 for Group 61 may issue a group membership certificate stating that the client 12 is a member of the group G1, while assigning a low trust rating on the respective group membership certificate. By issuing the group membership certificate with the low trust rating, the CA 16.1 for group G1 is indicating that it believes that the client 12 is probably a member of the group G1, but is not certain of this relationship. The file server 14 (or more generally any resource server) may be protecting resources that are not particularly sensitive. In this event, the file server 14 may include an access control list (ACL) that even group membership certificates bearing low trust ratings should be afforded access to the requested resource. On the other hand, more sensitive resources may have access control lists that would only allow access to users that present group membership certificates with a high trust rating.

In yet another example in which partially trusted information is being used, it is assumed that the administrator for a group G2 has received an email signed by the administrators manager and requesting that the client 12 be added to the group membership list for group G2. The administrator may not be able to establish a highly trusted chain of certificates to retrieve the manager's public key. In this event, the administrator cannot verify that the email that was received was actually from his manager. In this event, the administrator for group G2 may issue a group membership certificate that includes the client 12 but indicate that the membership of the client 12 has a low trust rating.

Other scenarios are envisioned in which the issuer of a certificate has less than absolute confidence in issuing a group credential, such as where an off-line check is done to establish membership within a group.

Though the trust ratings in the above described examples are identified as "high" and "low" for simplicity, it should be appreciated that the trust ratings may take many forms and different techniques may be employed for determining whether to grant access to a service or resource based upon the assigned trust ratings. For example additional gradations of trust ratings may be provided. Moreover, the trust ratings may be provided as numerical values within a predetermined scale in which one end of the numerical scale represents the lowest trust rating and the other end of the numerical scale represents the highest trust rating. In the event numerical trust ratings are employed, predetermined thresholds between various trust rating categories may be employed.

Furthermore, the trust ratings employed herein may comprise probability measures and the decision whether to grant access to a particular resource may be based upon an assessment of the respective probability in one or more of the certification paths.

Additionally, the trust ratings within a given certification path or among multiple certification paths may be averaged or otherwise mathematically manipulated to produce a trust rating that may be employed to determine whether to grant access to a service or resource.

Additionally, it is recognized that more than one system for identifying trust ratings may be employed. For example, a high and low trust rating may be employed by a first group membership server and a numerical scale may be employed by another group membership server. In such event, a mapping may be created such that trust ratings established using one mapping system may be converted to trust ratings employed in another mapping system to permit interoperability while using different trust rating identification systems. By way of illustration, it is assumed that a first trust rating assignment technique assigns trust ratings in the range of 0–19 to certificates having no trust, trust ratings of 20–39 to certificates having low trust, trust ratings of 40–59 to certificates having medium trust, trust ratings of 60–79 to certificates having high trust and trust ratings of 80–100 to certificates that are completely trustworthy. In a second trust rating assignment technique, it is assumed that only low, medium and high trust ratings are employed. In such event, trust ratings of 0–30 in the first trust rating identification technique may be mapped to the low trust rating in the second trust rating identification system, trust ratings of 40–59 within the first trust rating identification system may be mapped to the medium trust rating within the second trust rating identification system and trust ratings of 60–100 within the first trust rating identification system may be mapped into the high trust rating within the second trust rating identification system. It should be noted that any suitable mapping between numerical trust ratings and non-numerical trust rating identifications could be employed.

Additionally, mappings between one set of non-numerical set of trust ratings in a first trust rating system may be mapped into another set of trust ratings within a second trust rating system in a second trust rating system. By way of example and not limitation, trust ratings of having values of none, low, medium and high in a first trust rating identification system may be mapped into trust ratings having values of unrestricted, limited access, company confidential, and highly confidential respectively in a second trust rating identification system.

Additionally, although the above-described examples illustrate the use of trust ratings in group certificates in a determination of whether a file server should grant access to a file, it should be appreciated that the presently described technique may be employed in any application in which trust ratings are employed in a set of credentials that includes at least one group credential containing a trust rating and a determination is made whether to grant access to a resource or service based, at least in part, upon the trust rating or ratings within the set of credentials. By way of example, and without intending to limit the applicability of the presently described techniques, such may also be employed to grant access to a web page, a secure area, data within a database, privileges within a computer network or any other resource that is dependent, at least in part, upon the trustworthiness of a set of credentials that include at least one group credential.

Additionally, while in the present example, the access control program 14f within the file server 14 is described as performing all of the verifications, it should be appreciated that some or all of the functions attributed to the access control program 14f may be distributed among different ones of the CAs 16 or other servers within the system 10.

Further while the request is described in the above example as being issued by a client 12, the term client is used generally herein and such term may be applied to a user, a hardware or software process or any other suitable mechanism for issuing a request for access to the applicable resource or service.

In addition to access control functions, the presently described system and method may be employed in any system in which trust ratings associated with group credentials are employed for the purpose of evaluating and/or certifying the information contained in the group credential. For example, a signed email may be accompanied by a group credential that includes or is associated with a trust rating. The recipient of the email may elect to trust the contents of the email if the party signing the email is a member of a group that has been determined via a trust rating contained within or associated with the group credential to meet specified criteria.

Additionally, it is recognized that the group credentials described herein may comprise role credentials that define the role of the members of the group. By way of example, and not limitation, a role credential may identify as members of a group human resource personnel that are authorized to update a particular database, engineering managers, customer service personnel or any other applicable role within an organization or otherwise.

It should further be appreciated that a trust rating that is inserted within a credential in response to an electronic request for issuance of the respective credential may be based upon a trust rating associated with the electronic request or the level of authentication of the request.

Those skilled in the art should readily appreciate that the programs defining the functions performed by the client 12, the certification authorities 16 and access control program 14f can be delivered to the respective computers in many forms; including, but not limited to: (a) information permanently stored on non-writable storage media (e.g., read-only memory devices within a computer such as ROM or CD-ROM disks readable by a computer I/O attachment; (b) information alterably stored on writable storage media (e.g., floppy disks, tapes, read/write optical media and hard drives); or (c) information conveyed to a computer through a communication media, for example, using baseband signaling or broadband signaling techniques, such as over computer or telephone networks via a modem. In addition, while in the present embodiment the functions are illustrated as being software-driven and executable out of a memory by a processor, the presently described functions may alternatively be embodied in part or in whole using hardware components such as Application Specific Integrated Circuits (ASICs), programmable logic arrays, state machines, controllers or other hardware components or devices, or a combination of hardware components and software.

Finally, it will be appreciated by those of ordinary skill in the art that modifications to and variations of the above-described methods and system for utilizing trust ratings to determine whether access to a resource should be provided may be made without departing from the inventive concepts described herein. Accordingly, the invention should not be viewed as limited except as by the scope and spirit of the appended claims.

What is claimed is:

1. A method for evaluating a set of credentials comprising at least one group credential in response to a request to access a resource, comprising:

ascertaining at least one first trust rating explicitly included within at least one of said credentials within said set of credentials including said group credential, wherein each of said first trust ratings represents a level of confidence in information being certified within the respective credential;

in the event said set of credentials comprises a plurality of certification paths having at least one credential in each of said paths, determining, for each certification path of said plurality of certification paths, a respective third trust rating equal to a lowest first trust rating in the credentials of the respective certification path;

in the event said set of credentials does not comprise a plurality of certification paths, setting a second trust rating for said set of credentials to a lowest first trust rating of the at least one first trust ratings;

in the event said set of credentials comprises a plurality of certification paths, setting the second trust rating for said set of credentials to a highest third trust rating of said third trust ratings; and granting access to the resource in the event said second trust rating satisfies predetermined criteria.

2. The method of claim 1 wherein said granting step includes the step of comparing said second trust rating to a predetermined trust rating threshold and wherein said predetermined criteria comprises said predetermined trust rating threshold.

3. The method of claim 1 wherein said resource comprises a file on a file server.

4. The method of claim 1 wherein said resource comprises a web page.

5. The method of claim 1 wherein said resource comprises a secure area.

6. The method of claim 1 wherein said resource comprises a database.

7. The method of claim 1 wherein said ascertaining step further includes the step of obtaining an identity credential trust rating associated with an identity credential within said certification path.

8. A system for evaluating a set of credentials including at least one group credential in response to a request to access a resource, comprising:

a memory containing an access control program; and a processor operative to execute said access control program;

said access control program comprising:
- program code for ascertaining at least one first trust rating explicitly included within at least one of said credentials within said set of credentials including said group credential, wherein each of said first trust ratings represents a level of confidence in information being certified within the respective credential;
- program code operative in the event said set of credentials comprises plural certification paths, for determining for each certification path of said plural certification paths, a respective third trust rating equal to a lowest first trust rating in the credentials of the respective certification path;
- program code for setting, in the event said set of credentials does not comprise a plurality of certification paths, a second trust rating for said set of credentials a lowest first trust rating of the at least one first trust ratings;
- program code for setting, in the event said set of credentials comprises a plurality of certification paths, the second trust rating for said set of credentials to a highest third trust rating of said third trust ratings; and
- program code for granting access to the resource in the event said second trust rating satisfies predetermined criteria.

9. The system of claim 8 wherein said access control program further includes program code for comparing said second trust rating to a predetermined trust rating threshold and wherein said predetermined criteria comprises said predetermined trust rating threshold.

10. A computer program product including a computer readable medium, said computer readable medium having an access control program stored thereon, said access control program for execution on a processor and operable in response to a request to access a resource, comprising:
- program code for ascertaining at least one first trust rating explicitly included within at least one credential within a set of credentials including a group credential, wherein each of said first trust ratings represents a level of confidence in information being certified within the respective credential;
- program code operative, in the event said set of credentials forms a plurality of certification paths, for determining for each certification path of said plurality of certification paths, a respective third trust rating equal to a lowest first trust rating in the credentials of the respective certification path;
- program code for setting, in the event said set of credentials does not comprise a plurality of certification paths, a second trust rating for said set of credentials to a lowest first trust rating of the at least one first trust ratings;
- program code for setting, in the event said set of credentials comprises a plurality of certification paths, the second trust rating for said set of credentials to a highest third trust rating of said third trust ratings; and
- program code for granting access to the resource in the event said second trust rating satisfies predetermined criteria.

11. A system for evaluating a set of credentials including at least one group credential in response to a request to access a resource, comprising:
- means for storing an access control program; and
- means for executing said access control program out of said storing means, said access control program including:
  - program code for ascertaining at least one first trust rating explicitly included within at least one of said credentials within said set of credentials including said group credential, wherein each of said first trust ratings represents a level of confidence in information being certified within the respective credential;
  - program code operative, in the event said set of credentials comprises plural certification paths, for determining for each certification path of said plural certification paths, a respective third trust rating equal to a lowest first trust rating in the credentials of the respective certification path;
  - program code for setting, in the event said set of credentials does not comprise plural certification paths, a second trust rating for said set of credentials to a lowest first trust rating of the at least one first trust ratings;
  - program code for setting, in the event said set of credentials comprises plural certification paths, the second trust rating for said set of credentials to a highest third trust rating of said third trust ratings; and
  - program code for granting access to the resource in the event said second trust rating satisfies predetermined criteria.

12. A method for evaluating a set of credentials comprising at least one group credential in response to a request to access a resource, comprising:
- ascertaining at least one first trust rating explicitly included within at least one of said credentials within said set of credentials including said group credential, wherein each of said first trust ratings represents a level of confidence in information being certified within the respective credential;
- in the event said set of credentials comprises plural certification paths, determining, for each certification path of said plural certification paths, a respective third trust rating equal to a lowest first trust rating in the credentials of the respective certification path;
- in the event said set of credentials does not comprise plural certification paths, setting a second trust rating for said set of credentials to a lowest first trust rating of the at least one first ratings;
- in the event said set of credentials comprises plural certification paths, setting the second trust rating for said set of credentials to a highest third trust rating of said third trust ratings; and
- storing said second trust rating for subsequent use in determining whether to grant access to the resource.

13. The method of claim 12 further including the step of inserting said second trust rating stored in said storing step in another group credential.

* * * * *